No. 836,183. PATENTED NOV. 20, 1906.
J. J. DUKET.
HAT FASTENER.
APPLICATION FILED JAN. 7, 1905.
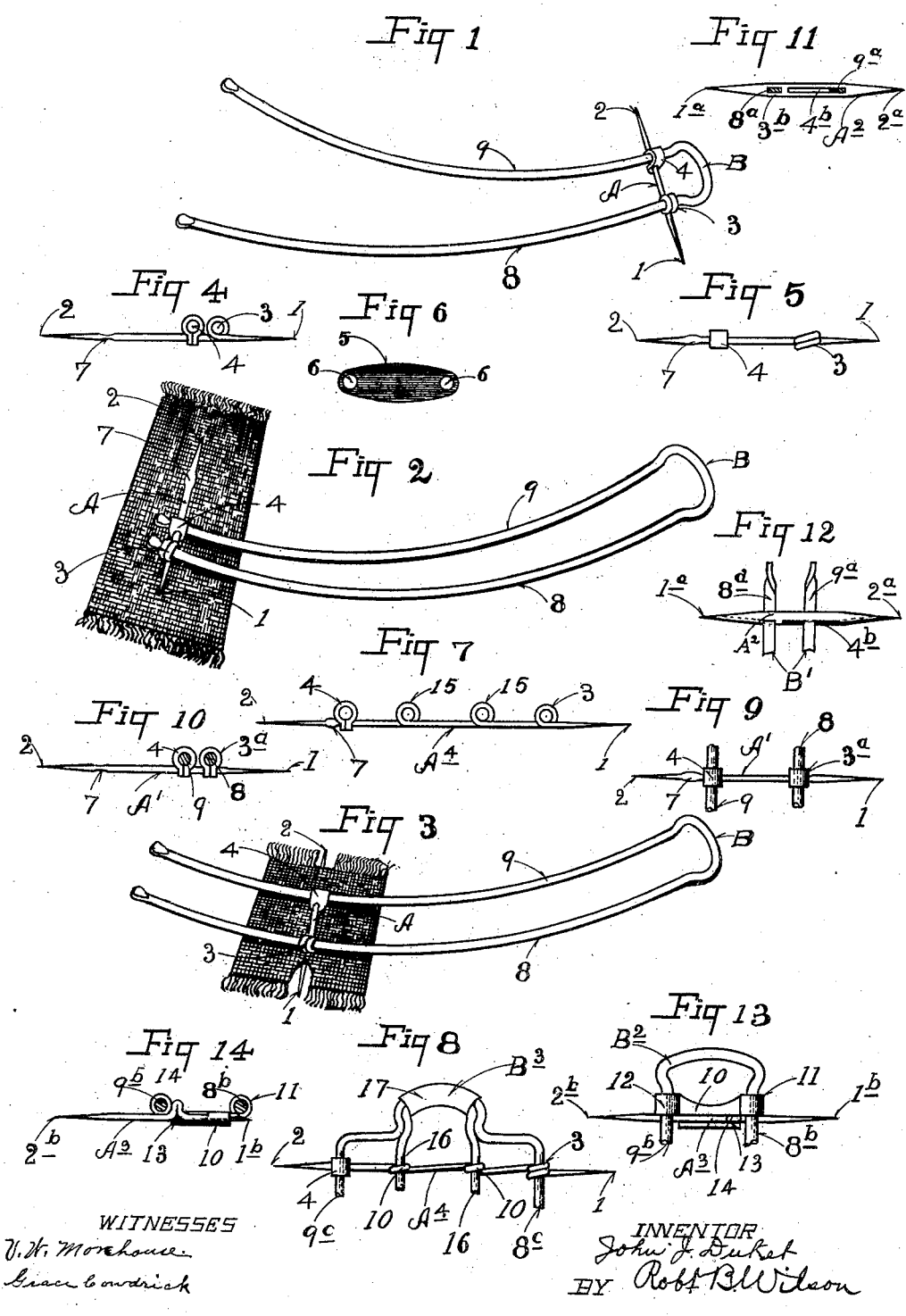

UNITED STATES PATENT OFFICE.

JOHN J. DUKET, OF TOLEDO, OHIO.

HAT-FASTENER.

No. 836,183.  Specification of Letters Patent.  Patented Nov. 20, 1906.

Application filed January 7, 1905. Serial No. 240,040.

*To all whom it may concern:*

Be it known that I, JOHN J. DUKET, a citizen of the United States, residing at Toledo, in the county of Lucas and State of Ohio, have invented a new and useful Improvement in a Hat-Fastener, of which the following is a specification.

My invention relates to a hat-fastener, and has for its object to provide a simple, inexpensive, and efficient device of the kind for securing a hat on the head of the wearer that may be conveniently and securely attached to the crown-lining of the hat at or near the line of its attachment to the brim at any desired point around the crown and that is so constructed that the means of its attachment to the hat is concealed.

I accomplish these objects by constructing a hat-fastener as hereinafter described and illustrated in the drawings, in which—

Figure 1 is a perspective view of the under side of my invention with the hair-pin pushed through the holder-pin to its head-bend. Fig. 2 is a similar view with the hair-pin drawn back through the holder-pin and with one tine or prong of the hair-pin flexed over toward the other in the first position for the attachment of the holder-pin. Fig. 3 is a similar view showing the holder-pin attached to a piece of fabric with portions of the fabric broken away to more plainly illustrate how the point portions of the holder-pin enter and are concealed by the fabric to which the holder-pin is attached. Fig. 4 is a side view of the holder-pin with the tine-guide loops in relative position for first insertion of the holder-pin. Fig. 5 is a top view of the holder-pin with the guide-loops in their normal positions when the holder-pin is attached. Fig. 6 is an enlarged view of a blank from which the movable tine-guide loop is formed. Fig. 7 is a side view of a holder-pin for a four-tined hair-pin detached from the hair-pin. Fig. 8 illustrates the same attached to a four-tined hair-pin with the tines broken away near the head end. Fig. 9 illustrates a modified form of holder-pin for a two-tined hair-pin in which both guide-loops are formed of the blank shown in Fig. 6, one of which is fixed and the other movable on the holder-pin with the movable guide-loop in its normal position on the holder-pin. Fig. 10 shows a side elevation of same with the movable tine-guide loop in relative position to the fixed guide-loop for first insertion of the holder-pin. Fig. 11 is a side elevation of another modified form of holder-pin which is provided in the central body portion with guides in the form of slots to receive flattened tines of a hair-pin, one of the guide-slots being elongated to permit transverse movement of the holder-pin as to one tine and the other being of a width to receive the other tine without lateral movement with the tines shown in cross-section in the slots in their normal position. Fig. 12 is a top view of the same with broken-away free end portions of the tines in the slots and showing partial transverse movement of the holder-pin as to one tine by a lateral flexing of the other. Fig. 13 is a top view of another modified form of holder-pin movably mounted in a groove in a holder-body having fixed guide-loops for the tines of the hair-pin and the holder-pin in its normal position in the groove transverse the tines; and Fig. 14 is a side elevation of the same, with a portion of one side of the holder-body broken away along the groove and showing the pin moved from its normal position to further project one point portion and withdraw the other.

In the drawings, A is a holder-pin pointed at each end and coiled nearer to the point 1 than to point 2 to form the fixed-tine guide-loop 3 and has movably mounted thereon the guide-loop 4, formed of a suitable blank 5, having the pin-holes 6, one near each end, the central portion of the blank being bent to form the loop 4 and to bring the end portions into coincidence with the pin-holes 6 in register. Slightly nearer to the point 2 than the distance of the coil 3 from the point 1 the pin A is flattened to form the stop 7, adapted to prevent the guide-loops 4 from being detached from the pin A. The point portions of the holder-pin A project oppositely from the guide-loops and are preferably each about one-half the length of the central body portion of the pin between the guide-loops in their normal positions.

In the guide-loops 3 and 4 are respectively inserted the arched and spreading spring-tines 8 and 9 of the hair-pin B, and the ends of the tines after insertion are flattened to prevent their entire withdrawal from the guide-loops. The tines are inserted in the loops with the pin transverse the outer curve of the tines of the hair-pin, as shown in the drawings. Thus constructed the device may be readily secured to a hat by first inserting the point 2 of the holder-pin through the bandeau or lining of the hat at any desired point of attachment at or near the junction of the brim and the crown, and pushing the pin inward through the lining and between the lining and the body of the hat until the movable guide-loop 4 is pressed against the lining and is arrested at the point of entrance of the pin and until the fixed guide-loop 3 is pressed over against the movable guide-loop in the position shown in Fig. 2, and then inserting the point 1 in the bandeau or lining and moving the pin in the opposite direction until the tines, the guide-loops, and the pin-holder are in their normal relative positions, as shown in Fig. 3. In this position both of the projecting point portions of the pin from the guide-loops outward are between the lining and the body of the hat and are concealed from view and the holder-pin is securely attached to the lining or bandeau of the hat with the hair-pin in position adapted to be pushed inward through the guide-loops into engagement with the hair or pulled outward for detachment therefrom.

The device may be readily detached from the hat by pushing the holder-pin by the fixed loop 3 toward the movable loop 4 until the point 1 of the pin is withdrawn from the lining and then withdrawing the point 2.

In the modified form of my hat-pin (shown in Fig. 9) the loop 3, formed by coiling the body of the holder-pin, is omitted from the holder-pin A', and a loop $3^a$, formed from the blank 5, is substituted and secured to the body of the pin in the position of the coil-loop of the pin A, (shown in Fig. 1,) preferably by flattening the pin on each side of the loop. Otherwise the construction is the same as that shown in Fig. 1.

In Figs 11 and 12 are shown another modified form of holder-pin $A^2$, in the central body portion of which in lieu of the tine-guide loops 3 and 4 (shown in Fig. 1) is provided the slots $3^b$ and $4^b$ to receive the tines $8^a$ and $9^a$ of a hair-pin B', formed of a flattened wire. The slot $3^b$ is of a width to receive the tine $8^a$, and the slot $4^b$ is elongated to permit the pin $A^2$ after the point $2^a$ is inserted through the outer edge of the crown-lining at its junction with the rim of the hat and thence between the lining and the brim along the inner face of the lining up to the tine $9^a$ to be moved transverse the tine $9^a$ by flexing the tine $8^a$ over against the tine $9^a$, in which position the point $1^a$ being oppositely inserted through the lining, and the tine $8^a$ being then released will spring back into its normal position relative to the tine $9^a$, and thereby further insert the point $1^a$, and partially withdraw the point $2^a$ and leave both point portions of the pin A concealed and in engagement with the lining.

In Figs. 13 and 14 are shown another modified form of my invention, in which a holder-pin $A^3$ is movably mounted in a holder-body 10, having the fixed tine-guide loops 11 and 12 formed on its opposite ends transversely thereto, and along one side of the holder 10 is formed a lengthwise groove 13, in which the holder-pin $A^3$ is mounted. The groove 13 is in a plane parallel with the common plane of the axes of the guide-loops and also in a plane parallel with the plane of adjacent ends of the guide-loops at right angles to the plane of the axes aforesaid, so that when the pin $A^3$ is in the groove its end portions extend across and beyond the ends of the loops on a line between the bores of the loops and a line coinciding with the bottom of the groove 13 extended.

In the guide-loops 11 and 12 are mounted and secured by flattened ends the tines $8^b$ and $9^b$, respectively, of a hair-pin $B^2$, which extends transverse the end portions of the pin $A^3$.

The pin $A^3$ is provided nearer one end than the other between the guide-loops with a stop 14, preferably formed by a return-bend of the body of the pin, which limits its lengthwise movement through the groove 13, and the stops and the tines of the hair-pin together confine the pin $A^3$ in the groove while allowing its lengthwise movement. The pin $A^3$ is also pointed at each end, and it is apparent when the pin is in its normal position, as shown in Fig. 13, that the point $2^b$ when pushed through the lining of a hat until the loop 12 is at the point of entrance of the pin that by engaging the stop 14 and pushing the pin in the direction of the point $2^a$ into position, as shown in Fig. 14, the point $2^b$ will be further extended underneath the fabric and the point $1^b$ will be drawn over next the tine $8^b$. In this position by depressing the point $1^b$ of the holder-pin to enter the lining a reverse movement of the pin to its normal position, as shown in Fig. 13, will result in the end portions of the pin outside the loops being engaged with and concealed underneath the lining, thereby securing both the holder-pin and the hair-pin to the hat.

In Figs. 7 and 8 are shown my invention applied to a four-tined hair-pin, in which a holder-pin $A^4$ of increased length is provided in addition to the coiled guide-loop 3, formed thereon and the movable guide-loop 4, with the intermediate coil-loops 15, in which are movably mounted the intermediate tines 16 of a four-tined hair-pin $B^3$, the outer tines $8^c$ and $9^c$ of which are respectively mounted in the fixed coil-loop 3 and the movable loop 4.

The pin $B^3$ is formed of two separate wires bent to form complementary head-bends, which are secured together by a plate 17 bent around the conjoined head-bends. In all other respects the construction of this form of fastener is similar to the one shown in Figs. 1, 2, 3, 4, and 5.

It will be seen that each one of the holder-pins herein shown and described is attached to a hat in the same way—viz., by pushing the pin in one direction to project one point portion beyond its normal projection through the lining and between the lining and the body of the hat and then depressing and inserting the opposite point and drawing the pin back into its normal position relative to the tines—the same result being secured by each—namely, to engage both point portions of the pin up to the guides with the lining without bending the pin and entirely concealing them from view and so secured in each of the forms shown. The guides engaging the fabric at the point of entrance of the pin prevent any lateral movement of the hair-pins or of the holder-pin except by applying some force thereto. It is manifest also that the holder-pin herein described may be readily adapted to conveniently and securely attach other forms of hair-engaging devices than those shown and described herein, and I therefore do not limit myself to its use with the special forms of hair-engaging devices herein shown and described.

I am aware that flexible holder-pins pointed at each end and mounted transversely of the tines of the hair-pin have been used; but in such cases to attach the pin to the hat requires the point portions to be bent at right angles to the body of the holder-pin for insertion through the body of the hat and then to be again bent parallel with the central body portion of the pin, and to detach the pin requires the unbending of the point portions, the repetition of which often results in the breaking of the pin. By my construction I have provided a pin that is more conveniently attached and that wholly avoids such destructive bending.

What I claim to be new is—

1. In a hat-fastener, the combination of a tined hair-pin, and a holder-pin having pointed end portions extending oppositely, the holder-pin being provided with guides to receive, each a tine of the hair-pin, the tines of the hair-pin being movable lengthwise back and forth through the guides transverse the holder-pin, and the holder-pin being movable, for its attachment and detachment, lengthwise back and forth transverse a tine of the hair-pin.

2. In a hat-fastener, the combination of a spring-tined hair-pin, and a holder-pin provided with guides to receive, each a tine of the hair-pin, the holder-pin being pointed at each end and mounted transverse the tines of the hair-pin with the pointed end portions of the holder-pin normally projecting oppositely a distance beyond the tines, the tines of the hair-pin being movable lengthwise back and forth through the guides transverse the holder-pin, and the holder-pin being movable lengthwise transverse a tine of the hair-pin, substantially as and for the purpose set forth.

3. In a hat-fastener, the combination of a holder-pin having a fixed guide, a stop, and a guide movably mounted thereon between the fixed guide and the stop, and a spring-tined hair-pin having tines mounted in the guides and movable lengthwise therein back and forth transverse the holder-pin, the holder-pin having pointed end portions projecting oppositely a distance beyond the guides when the guides are normally separated by the tines at the distance between the fixed guide and the stop.

In testimony whereof I have signed my name to this specification, in the presence of two subscribing witnesses, this 5th day of January, 1905.

JOHN J. DUKET.

Witnesses:
V. W. MOREHOUSE,
GRACE COUDRICK.